US009521053B1

(12) United States Patent
Chen et al.

(10) Patent No.: US 9,521,053 B1
(45) Date of Patent: Dec. 13, 2016

(54) PROVIDING DIAGNOSTIC METRICS FOR VIRTUAL CONNECTIONS OVER PHYSICAL CONNECTIONS INTO A PROVIDER NETWORK

(71) Applicant: Amazon Technologies, Inc., Reno, NV (US)

(72) Inventors: Po-Chun Chen, Herndon, VA (US); Shuguang Wang, Washington, DC (US); Mark Edward Stalzer, Arlington, VA (US); Shuai Ye, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 72 days.

(21) Appl. No.: 14/526,408

(22) Filed: Oct. 28, 2014

(51) Int. Cl.
*H04L 12/26* (2006.01)
*H04L 12/46* (2006.01)
*H04L 12/24* (2006.01)

(52) U.S. Cl.
CPC .......... *H04L 43/08* (2013.01); *H04L 12/4641* (2013.01); *H04L 41/22* (2013.01); *H04L 43/06* (2013.01)

(58) Field of Classification Search
CPC ...... H04L 43/08; H04L 43/06; H04L 12/4641; H04L 41/22
See application file for complete search history.

(56) References Cited

U.S. PATENT DOCUMENTS

| | | | |
|---|---|---|---|
| 7,616,579 B2 | 11/2009 | Slattery et al. | |
| 7,840,670 B2 | 11/2010 | Hedayat et al. | |
| 7,945,656 B1 | 5/2011 | Remaker | |
| 7,986,689 B2 | 7/2011 | Shen et al. | |
| 8,724,642 B2 | 5/2014 | Miller et al. | |
| 8,959,203 B1 * | 2/2015 | Miller | H04L 47/00 709/223 |
| 9,141,947 B1 * | 9/2015 | Furr | G06Q 20/102 |
| 2004/0255192 A1 | 12/2004 | Watanabe et al. | |
| 2010/0075751 A1 | 3/2010 | Garvey et al. | |

(Continued)

FOREIGN PATENT DOCUMENTS

| | | |
|---|---|---|
| JP | 2002232427 | 8/2002 |
| WO | 2010068630 | 6/2010 |
| WO | 2011049742 | 4/2011 |

OTHER PUBLICATIONS

U.S. Appl. No. 14/183,160, filed Feb. 18, 2014, Shuai Ye et al.

(Continued)

*Primary Examiner* — Phuc Tran
(74) *Attorney, Agent, or Firm* — Robert C. Kowert; Meyertons, Hood, Kivlin, Kowert & Goetzel, P.C.

(57) ABSTRACT

A provider network may collect diagnostic metrics for virtual connections implemented over physical connections to resources in the provider network. Diagnostic metric collection may be enabled via an interface for the provider network. In response to receiving a request to enable diagnostic metric collection for a particular virtual connection, a diagnostic agent within the provider network may begin sending diagnostic request messages to a client-side endpoint via the particular virtual connection. Responses to the request messages may be received back at the diagnostic agent. The diagnostic responses may then be used to generate diagnostic metrics for the particular virtual connection, which may be provided through the provider network interface.

20 Claims, 9 Drawing Sheets

(56) References Cited

U.S. PATENT DOCUMENTS

2013/0128751 A1* 5/2013 Keesara .............. H04L 43/0811
370/248

OTHER PUBLICATIONS

U.S. Appl. No. 14/625,539, filed Feb. 18, 2015, Po-Chun Chen.
U.S. Appl. No. 14/625,537, filed Feb. 18, 2015, Po-Chun Chen.
AWS Documentation, "Accept a Hosted Connection", Oct. 22, 2013, 1 page.
AWS Documentation, "Adding a Hardware Virtual Private Gateway to Your VPC", Oct. 15, 2013, pp. 1-6.
Amazon Web Services, "AWS Direct Connect; User Guide, API Version", Oct. 22, 2013, pp. 1-42.
Amazon Web Services, "Amazon Virtual Private Cloud, User Guide, API Version", Oct. 1, 2013, pp. 1-147.
AWS Documentation, "Welcome", Oct. 22, 2013, pp. 1-2.
U.S. Appl. No. 14/192,476, filed Feb. 27, 2014, Shuai Ye et al.
U.S. Appl. No. 13/306,801, filed Nov. 29, 2011, Kevin Christopher Miller.
U.S. Appl. No. 13/306,775, filed Nov. 29, 2011, Kevin Christopher Miller.
U.S. Appl. No. 13/330,449, filed Dec. 19, 2011, Michael B. Furr.
U.S. Appl. No. 13/330,438, filed Dec. 19, 2011, Kevin Christopher Miller.
U.S. Appl. No. 13/335,490, filed Jul. 23, 2013, Kevin Christopher Miller.

* cited by examiner

PROVIDING DIAGNOSTIC METRICS FOR VIRTUAL CONNECTIONS OVER PHYSICAL CONNECTIONS INTO A PROVIDER NETWORK

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers, may wish to take advantage of private or direct connections to provider networks, rather than utilizing publicly available connections (e.g., via the Internet). In this way, the connections between these customers and provider networks can be optimized for performance and increased utilization of provider network resources. Virtualization techniques may even be applied to private or direct connections to provider networks, partitioning the connections into one or more separate virtual connections which may be flexibility allocated to provide different connections to various resources in provider networks.

Figure 1:
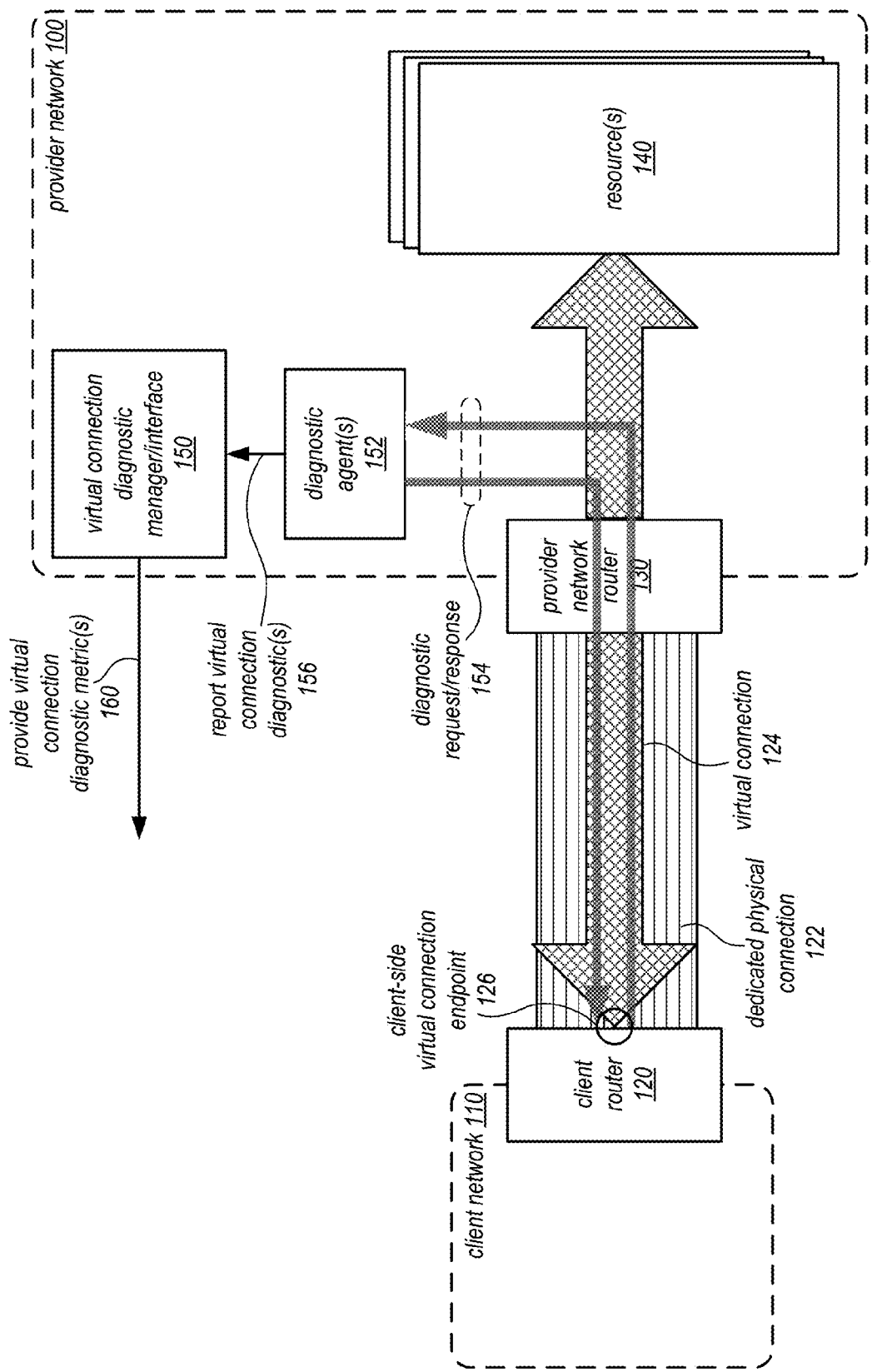
FIG. 1 is a diagram of providing diagnostic metrics for virtual connections over physical connection into a provider network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement providing diagnostic metric information for virtual connections over a physical connection into a provider network, according to some embodiments. A provider network may supply clients, operators, or other customers with access to and/or control of one or more computing resources. These resources may include various types of computing systems or devices configured for communication over a network. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Customers of the provider network may reserve (i.e., purchase or buy) one or more compute resources (such as compute instances) or utilize other resources to perform various functions, services, techniques, and/or applications.

A given provider network may typically include several large data centers hosting various resource pools, such as collections of physical and/or virtualized computer servers, storage devices, networking equipment and the like, needed to implement, configure and distribute the infrastructure and services offered by the provider. In order to extend the geographical areas over which its services can be accessed with desired levels of performance, reliability and security, an operator of a provider network may establish private or dedicated network paths between its data centers and one or more routers that may be physically located at an external facility. The facilities at which these routers may be housed are sometimes referred to as "router co-location facilities", as they may sometimes house routers and other network equipment owned and/or managed by business entities other than the provider network's operator. In at least some embodiments, a given co-location facility may include a router belonging to or managed by the provider network operator, linked by a dedicated physical connection to another router belonging to or owned by an entity (i.e. a customer of the provider network) operating a client network that is external to the provider network. In this way various systems, components, and/or devices implemented within the client network may utilize the dedicated physical connection for traffic between provider network resources assigned to the customer (such as compute instances, storage service nodes and the like) and external resources located outside the provider network.

Virtual connections may be established over dedicated physical connections between a client network and a provider network in order to connect the client network to resources implemented within the provider network for the client network. A virtual connection, which may also be referred to as a virtual interface, and may provide a logically isolated network path that enables connectivity over the dedicated physical connection between some set of external devices in a client network and some set of provider network resources. Virtual connections of several different types may be configurable in some embodiments, depending on the desired extent of network isolation and network address visibility of the devices to be connected. For example, in some embodiments, a provider network may support establishment of isolated virtual networks on behalf of various customers.

An isolated virtual network (which may also be referred to in some environments as a virtual private cloud or VPC) may comprise a collection of computing and/or other resources in a logically isolated section of the provider network, over which the entity operating the client network is granted substantial control with respect to networking configuration. In some embodiments, for example, a customer may select the IP (Internet Protocol) address ranges to be used for the isolated virtual network resources, manage the creation of subnets within the isolated virtual network, and the configuration of route tables, gateways, etc. for the isolated virtual network. For at least some of the devices within an isolated virtual network in some embodiments, the network addresses may not be visible outside the isolated virtual network, at least by default. In order to enable connectivity between an isolated virtual network and the customer's client network (e.g., devices at the customer's data center or office premises) via a dedicated physical connection, a virtual connection that is configured for use with private addresses (and is therefore may be termed a private virtual connection) and a virtual private gateway may be set up. A customer-side gateway (e.g., for traffic directed to or from the customer's external network) may also have to be set up in some implementations. In some embodiments one or more VPNs (virtual private network) may be configured between the customer's isolated virtual network and external networks (such as the customer's office network or the customer's data centers). In at least some embodiments, such VPNs may utilize secure networking protocols such as IPSec (Internet Protocol Security), SSL/TLS (Secure Sockets Layer/Transport Layer Security), DTLS (Datagram Transport Layer Security) and the like.

Providing virtual connections into a provider network allows customers of the provider network to flexibly utilize a dedicated physical connection into the provider network. Multiple different virtual connections may be established that communicate with different resources for various different functions. Some virtual connections may be to publicly available services, while other virtual connections on the same dedicated physical connection may be to resources in isolated virtual networks, as described above. This flexibility may increase the number of virtual connections over a single dedicated physical connection. For a provider network that implements network routers that accept multiple dedicated physical connections at a same device, the number of given virtual connections routing traffic through a particular provider network router may grow large.

When utilizing a virtual connection, it may be desirable for a customer to understand the performance of the virtual connection. Diagnostic metrics, such as packet loss, latency, and various other health or performance metrics may indicate whether adjustments or different configurations for a particular virtual connection may need to be performed. However, to provide consistent diagnostic metrics to a customer on top of servicing the other traffic for the various virtual connections traveling through a provider network router may prove burdensome, overwhelming traffic control components for the provider network router. Provider networks may instead provide diagnostic metrics for individual virtual connections into the provider network in a way that removes the burden from the provider network to handle diagnostic requests in addition to the regular traffic load.

FIG. 1 is a diagram of providing diagnostic metrics for virtual connections over physical connection into a provider network, according to some embodiments. Provider network 100 may have established a dedicated physical connection 122 with client network 110. A physical connection between client router 120 and provider network router 130 may allow traffic to pass between client network 110 and provider network 100. A virtual connection 124 may also be established to allow client network 110 to access resource(s) 140 via the particular network path provided by the virtual connection 124.

Diagnostic metric collection for virtual connection 124 may be enabled at provider network 100. In some embodiments, diagnostic metric collection may be performed automatically or by default. In some embodiments, a request may be received from the customer operating client network 100 (e.g., via a client system—not illustrated) to virtual connection diagnostic manager/interface 150. One or more diagnostic agents 152 may be provisioned within provider network 100. In at least some embodiments, a diagnostic agent may be a compute instance or node configured to perform various techniques described below with regard to FIGS. 3 and 7 below. Diagnostic agent(s) 152 may be configured to access the virtual connection 124. If resource(s) 140 are public, then the diagnostic agent(s) 152 within the provider network may already view the virtual connection 124. However, for private virtual connections (e.g., resources 140 in an isolated virtual network), diagnostic agent(s) 152 may be provisioned with a specific configuration to access the private virtual connection, as described in more detail below with regard to FIG. 6.

Once configured, diagnostic agent(s) 152 may begin sending diagnostic requests to and receiving diagnostic responses 154 from client-side virtual connection endpoint 126 via virtual connection 124. In this way, the burden of handling diagnostic requests may be removed from a provider network router and distributed among those client routers that implement dedicated physical connections into provider network 100. Communicating diagnostic requests and responses 154 over virtual connection 124 allows for end-to-end measurements to be taken that simulate a route that other traffic from a client-side virtual connection endpoint 126 may travel to reach resources 140, in various embodiments.

Diagnostic requests, in various embodiments, may be formatted according to Internet Control Message Protocol (ICMP), such as a ping request, and may collection various diagnostic information such as packet loss and latency. Client-side virtual connection endpoint 126 may be a network address or other identifier that indicates an initial location for virtual connection 124. In various embodiments, the client-side virtual connection endpoint is implemented/hosted at client router 120. The diagnostic responses 154 received at diagnostic agent(s) 152 may be stored for later analysis and/or reported 156 to virtual connection diagnostic manager interface 150. Diagnostic metrics based, at least in part, on the diagnostic responses, may then be provided 160 to requesting clients, systems, or other components or devices with authorization to obtain the diagnostic metrics for virtual connection 124.

Please note that previous descriptions are not intended to be limiting, but are merely provided as an example of provider networks, client networks, physical and virtual connections, resources, and routers. The number or arrangement of components, such as the number or arrangement of virtual connections may be implemented in many different ways.

This specification next includes a general description of a provider network, which may implement diagnostic metric collection for virtual connections over a physical connection into the provider network. Then various examples of a provider network are discussed, including different components/modules, or arrangements of components/module that may be employed as part of implementing a diagnostic metric collection for a virtual connection into a provider network. A number of different methods and techniques to implement providing diagnostic metrics for virtual connections over a physical connection into a provider network are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
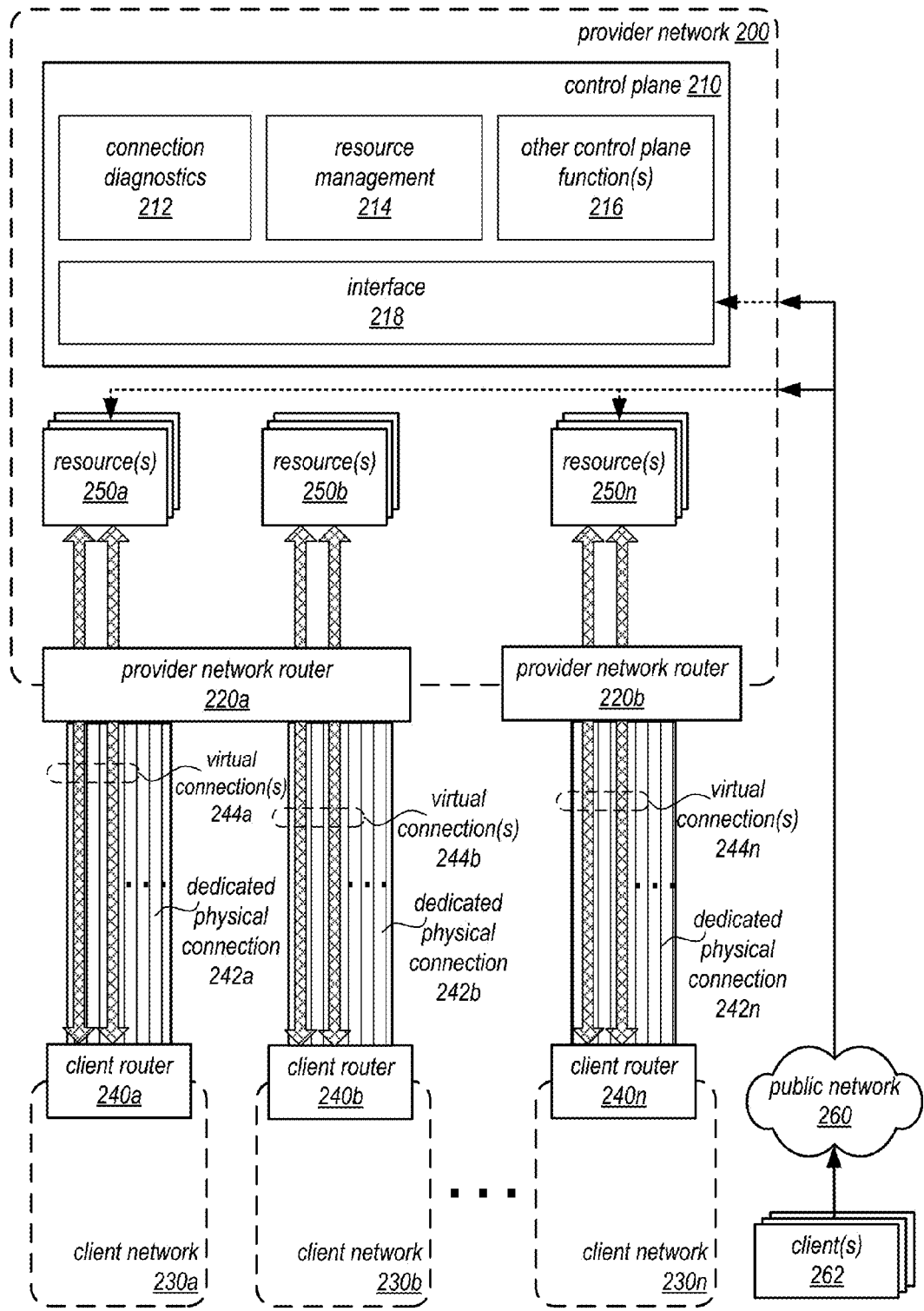
FIG. 2 is a block diagram of a provider network that accepts dedicated physical connections and virtual connections, according to some embodiments.

FIG. 2 is a block diagram of a provider network that accepts dedicated physical connections and virtual connections, according to some embodiments. Provider network 200 may offer various computing resources to clients, such as various types of data analysis, processing, and storage. Computationally intensive applications or systems may utilize multiple distributed computing resources in provider network 200 to provide scalable solutions for a variety of different computing applications. Provider network 200 may be may be set up by an entity such as a company or a public sector organization to provide one or more network-based services (such as various types of cloud-based computing or storage) accessible via a public network 260 (e.g., the Internet) and/or other networks to clients 262. Clients 262 may be configured to access provider network via public network 260, which may ultimately communicate with routers of provider network (not illustrated).

Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may implement multiple fault tolerant zones, which may isolate failures to a particular zone such that a failure in or of one fault tolerant zone may not cause or trigger a failure in another fault tolerant zone (allowing computing resources in the other fault tolerant zone to continue operating in the event of a failure of another fault tolerant zone). Different data centers, isolated power or computing infrastructures, and/or other provider network architectures may be implemented to provide multiple fault tolerant zones (sometimes referred to as availability zones). While grouped together in FIG. 2, different resources for a client network, such as resource(s) 250*a* for client network 230*a* may be distributed across one or more fault tolerant zones, in some embodiments.

Provider network 200 may include the hardware (e.g., modems, routers, switches, load balancers, proxy servers, etc.) and software (e.g., protocol stacks, accounting software, firewall/security software, etc.) necessary to establish networking links between different components of provider network 200 as well as external networks (e.g., the Internet) or client networks with dedicated physical connections. In some embodiments, provider network 200 may employ an Internet Protocol (IP) tunneling technology to provide an overlay network via which encapsulated packets may be passed through the provider network 200 using tunnels.

Like provider network 200, a client network 230 may offer or provide various applications or services to users of the client network 230. For example, client networks 230 may be internal networks for various different companies, enterprises or organizations. In some embodiments, client networks 230 may provide publicly available services, which may be accessible via a public network like the Internet. As part of providing the respective services or functions, client networks may utilize various resources offered by provider network 200. In order to enable connectivity between a number of client networks, such as client networks 230*a*, 230*b*, and 230*n*, and multiple resource(s), such as resources 250*a*, 250*b*, and 250*n*, a dedicated physical connection 242 may be implemented. For example, the dedicated physical connection may include one or cables physically linking a pair of co-located routers, one belonging to or managed by the provider network (e.g., provider network router 220) and one belonging to or managed by a client network (e.g., client router 240*a*). In at least some embodiments, the provider network router 220 and the client router 240 may be located within a co-location facility. However, in other embodiments the two routers may not be located within a same facility or location.

In various embodiments, dedicated physical connections 242 may be utilized to implement one or more multiple virtual connections, such as virtual connections 244*a*, 244*b*, and 244*n*. As discussed earlier, a virtual connection may act as an independent connection and interface to resources in a provider network, allowing for a single client network to implement multiple different connections for different types of resources in provider network. For example, some resources may be publicly available services, which may also be accessed by clients 262 via public network 260 (as illustrated by the dotted line arrows to resources 250*a* and 250*n*). Other resources may be private and may be implemented in an isolated virtual network, such as discussed in more detail below with regard to FIG. 6, and therefore may not be accessible to clients 262 via public network 260 (e.g., resources 250*b* or any other system, component, or device not within the isolated virtual network). A virtual connection may be implemented to connect a client network 230 with either type of public or private resource. In order to establish a virtual connection 244, a client 262 associated with a customer account for a particular client network 230 may have to request that the virtual connection be established over the already established dedicated physical connection 242. Various parameters may have to be supplied to an administrative component of provider network 218, such as a resource management module 214 in control plane 210, in some embodiments. These parameters may include, for example, one or more of: (a) a VLAN (virtual local area network) identifier or tag that complies with the Ethernet 802.1Q standard, (b) an Internet Protocol (IP) prefix, address range or address, (c) a Border Gateway Protocol (BGP) Autonomous System Number (ASN), or (d) a BGP key. Once established, various systems, components, or devices in client networks 230 may communicate with resources 250 over the respective virtual connections 244.

Provider network 200 may implement control plane 210 to manage the various resources 250 offered by provider network 200. Control plane 210 may be implemented by various collections servers, nodes, computing systems or devices, such as may be generally described below with regard to computing system 1000 in FIG. 9. Control plane 210 may implement an interface 218, which may be accessible either by client networks 230 over the virtual connections 244, or via public network 260 utilizing clients 262 (which may be associated with client networks 230 or linked to common customer accounts of the different client networks). Interface 218 may handle various requests to procure, reserve, enable, disable, configure, or otherwise manage the resources 250 and/or the various connections to provider network 200 (both physical 242 and virtual 244). For example, interface 218 may provide the various interfaces described below with regard to FIGS. 3-8 for enabling diagnostic metric collection for virtual connections. Interface 218 may be programmatic, such as may be implemented by an Application Programming Interface (API), and/or a graphical user interface (GUI).

In at least some embodiments, control plane 210 may implement various resource management functions as part of resource management module 214. For example, launching and configuring the various resources 250 may be internally managed and performed by resource management module 214. Other control plane function(s) 216 may also be implemented by control plane module 216, and may include authenticating client(s) 262 (e.g., associating them with particular customer accounts), metering resource usage for different client networks, billing customer accounts associated with the client networks, and any other management or control functions to provide the various services of provider network 200.

Connection diagnostics module 212 may be implemented by provider network 200 in control plane 210 to provide diagnostic metrics for the various virtual connections 244 into provider network 200. For example, connection diagnostic module may implement the various techniques described above with regard to FIG. 1 and below with regard to FIGS. 3, 6, and 7, for provisioning diagnostic agents, collecting diagnostic information agents, analyzing/generating diagnostic metrics, and providing the diagnostic metrics for particular virtual connections via interface 218 either to clients 262 associated with the client network 230 of the virtual connection or other components of a client network 230 configured to communicate with interface 218.

In various embodiments, clients 262 may encompass any type of client configurable to manage, operate or configure connections or resources to provider network 200. For example, a given client may implement various tools, scripts, or other modules that may be able to configure a respective physical 242 or virtual 244 connection, test the connection, and start or terminate the connection. As part of managing the connections and resources, clients 262 may submit various requests to provider network via interface 218. In order submit requests to provider network 200, a given client 262 may include a suitable version of a web browser, or may include a plug-in module or other type of code module configured to execute as an extension to or within an execution environment provided by a web browser. Alternatively, a client 262 may encompass an application such as a resource/connection management or information client (or user interface thereof) that may make use of provider network 200 to manage various resources and connections. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 262 may be configured to generate network-based services requests according to a Representational State Transfer (REST)-style network-based services architecture, a document- or message-based network-based services architecture, or another suitable network-based services architecture In some embodiments clients 262 may convey requests to provider network 200 via a public network 260, which may be a public connection to provider network 200. In various embodiments, the public network 260 may encompass any suitable combination of networking hardware and protocols necessary to establish network-based communications between clients 262 and provider network 200. For example, a network may generally encompass the various telecommunications networks and service providers that collectively implement the Internet. A network may also include private networks such as local area networks (LANs) or wide area networks (WANs) as well as public or private wireless networks. It is noted that in some embodiments, clients 262 may communicate with provider network 200 using a private network rather than the public Internet.

Figure 3:
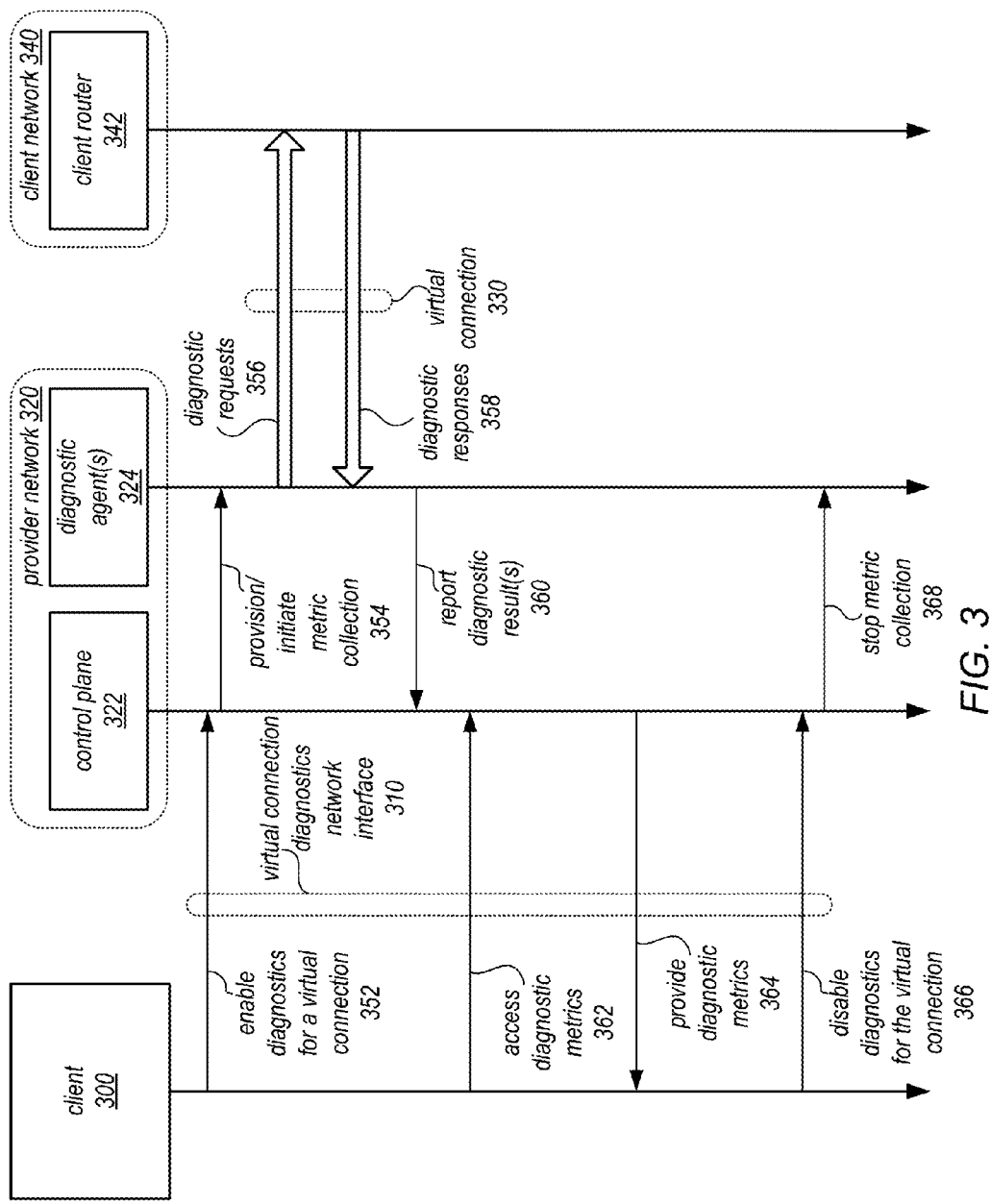
FIG. 3 is a sequence diagram illustrating interactions between a client network and a provider network that provides diagnostic metrics for virtual connections, according to some embodiments.

FIG. 3 is a sequence diagram illustrating interactions between a client network and a provider network that provides diagnostic metrics for virtual connections from the client network into the provider network, according to some embodiments. Client 300 may be a client associated with a particular client network, such as client network 340, which may interact with provider network 320 to manage diagnostic metric collection for a virtual connection from client network 340 to one or more resources in provider network 320.

Client 300 may send a request 352 to enable diagnostics for a particular virtual connection 330 to provider network 320. The enablement request 352 may be received via virtual connection diagnostics network interface 310 at control plane 322 of provider network 320. Virtual connection diagnostics network interface 310 may be programmatic, such as an API, and thus request 352 may be formatted according to the programmatic interface. The request may specify information identifying the particular virtual connection (e.g., a connection identifier), the dedicated physical connection, the amount or type of diagnostic metrics to collect, a client-side virtual connection endpoint, and/or any other information to perform virtual connection diagnostics. Control plane 322 may then provision and/or initiate metric collection 354 at diagnostic agent(s) 324 within provider network 320. As discussed below with regard to FIG. 6, diagnostic agent(s) may be configured to communicate diagnostic requests/responses to a client-side virtual connection endpoint for virtual connection 330, whether the resources in provider network are publicly available, or located in an isolated virtual network. Diagnostic agent(s) 324 may begin sending multiple diagnostic requests 356 and receiving diagnostic responses 358 via virtual connection 330 to a client-side endpoint for virtual connection 330, which may be implemented at client router 342.

Diagnostic agent(s) 324 may report back diagnostic result(s) 360 to control plane 322. Control plane 322 may provide diagnostic metrics based on the diagnostic results reported for virtual connection 330. In some embodiments, the diagnostic metrics may be automatically provided, sent, or forward to client 300, or some other system, location, or device for later access and/or analysis. In another example, client 300 may explicitly request diagnostic metrics, issuing a request to access 362 diagnostic metrics 362 via virtual connection diagnostics network interface 310 to control plane 322, in various embodiments. The request 362 may, for instance, specify select diagnostic metrics, such as latency and/or packet loss for virtual connection 330. In some embodiments, the request 362 may specify a time frame, range, or other indicator that identifies a subset of the diagnostic information collected. Control plane 322 may provide the requested diagnostic metrics 364 via virtual connection diagnostics network interface 310 to client.

As with enabling diagnostic metric collection, client 300 may disable diagnostics for the virtual connection 366, in various embodiments. Once received via the virtual connection diagnostics network interface 310, control plane 322 may stop metric collection 368 at diagnostic agent(s) 324.

Figure 4:
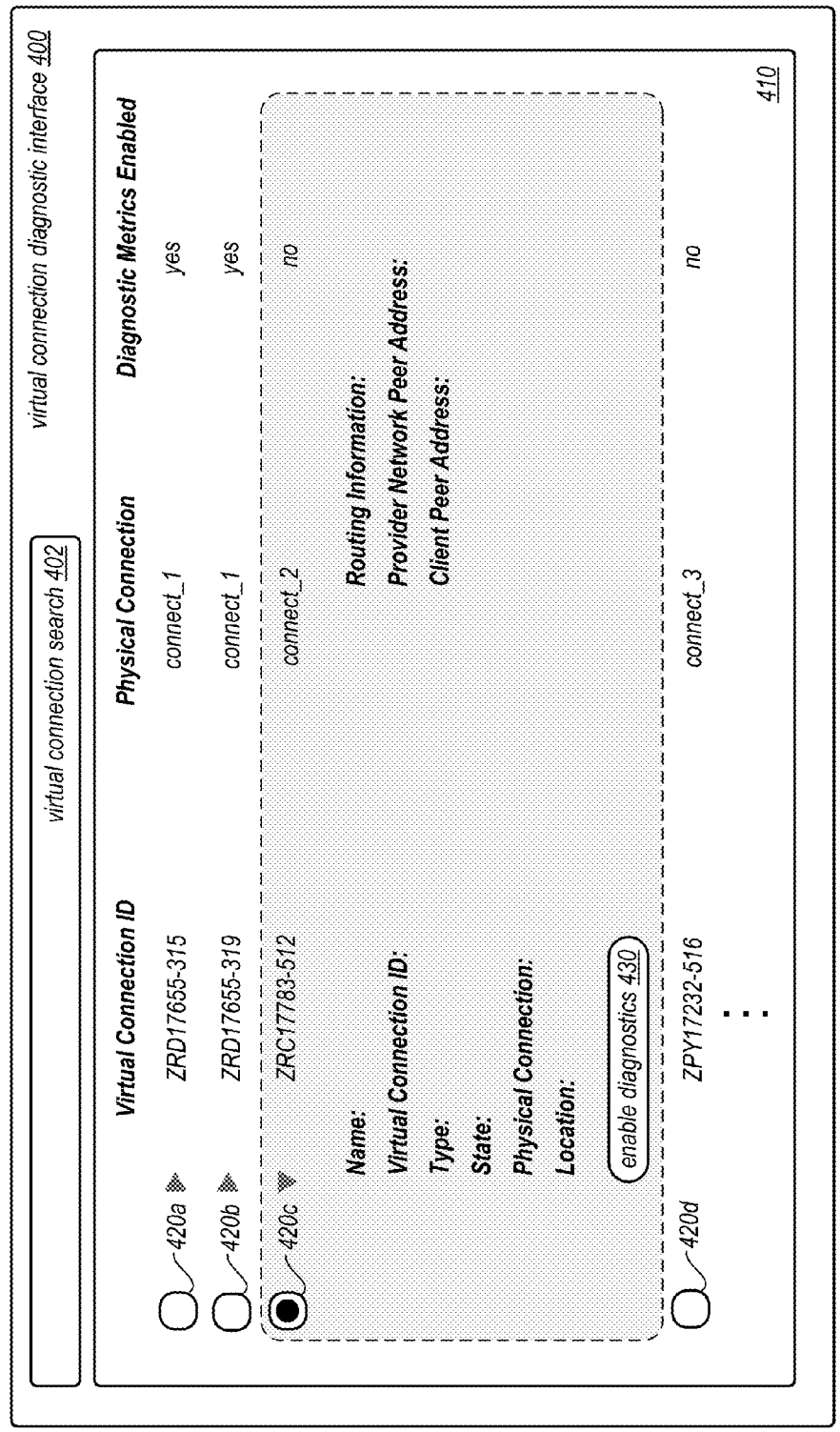
FIG. 4 is a diagram illustrating a graphical user interface for enabling or disabling collection of diagnostic metrics for a virtual connection into a provider network, according to various embodiments.

An interface for a provider network may be implemented in many different ways. As discussed above with regard to FIG. 3, a programmatic interface may be implemented which a client associated with a client network may interact. A graphical user interface may also be implemented in some embodiments. For example, a web site may be implemented that allows a client to enable, disable, and/or request diagnostic metrics for a particular virtual connection. FIG. 4 is a diagram illustrating a graphical user interface for enabling or disabling collection of diagnostic metrics for a virtual connection into a provider network, according to various embodiments.

Virtual connection diagnostic interface 400 may be a graphical user interface provided by a provider network for managing the collection of diagnostic metrics for virtual connections into the provider network. In at least some embodiments, a discovery mechanism, such as virtual connection search element 402 may be implemented to enable the discovery of virtual connections for which diagnostic metrics may be managed. For example, in some embodiments, a client network may have a large number of virtual connections into a provider network, and thus, a user may input a search of a particular ID, name, description, or other identifying information to locate the particular connection for managing diagnostics.

As illustrated in FIG. 4, virtual connection diagnostic interface 400 may implement a display element 410 which lists different virtual connections for which the collection of diagnostic metrics may be enabled or disabled. For example, user interface elements corresponding to different virtual connections such as graphical user interface elements 420a, 420b, 420c, and 420d (which correspond to virtual connections ZRD17655-315, ZRD17655-319, ZRC17783-512, and ZPY17232-516 respectively), may be selected to provide further details about the connection and provide further user interface elements to enable or disable diagnostic metrics collection. For example, as illustrated in FIG. 4, graphical user interface element 420c is selected, providing further details for virtual connection ZRC17783-512. For example, a virtual connection name, ID, type (e.g., public or private), state (e.g., online, offline), physical connection, location (e.g., physical connection location), routing information, provider network peer address, and client peer address may be provided in a detailed view of the virtual connection. Enable diagnostics use interface element 430 may be provided to enable the collection of diagnostic metrics for virtual connection ZRC17783-512 (which is not currently enabled). If selected, then the various interactions described above with regard to FIG. 3 and below with regard to FIGS. 6 and 7. Alternatively, if another virtual connection is selected for which diagnostic metric collection is enabled (e.g., element 420a for ZRD17655-315), then a user interface element may be provided in a detail view to disable the collection of diagnostic metrics.

Figure 5:
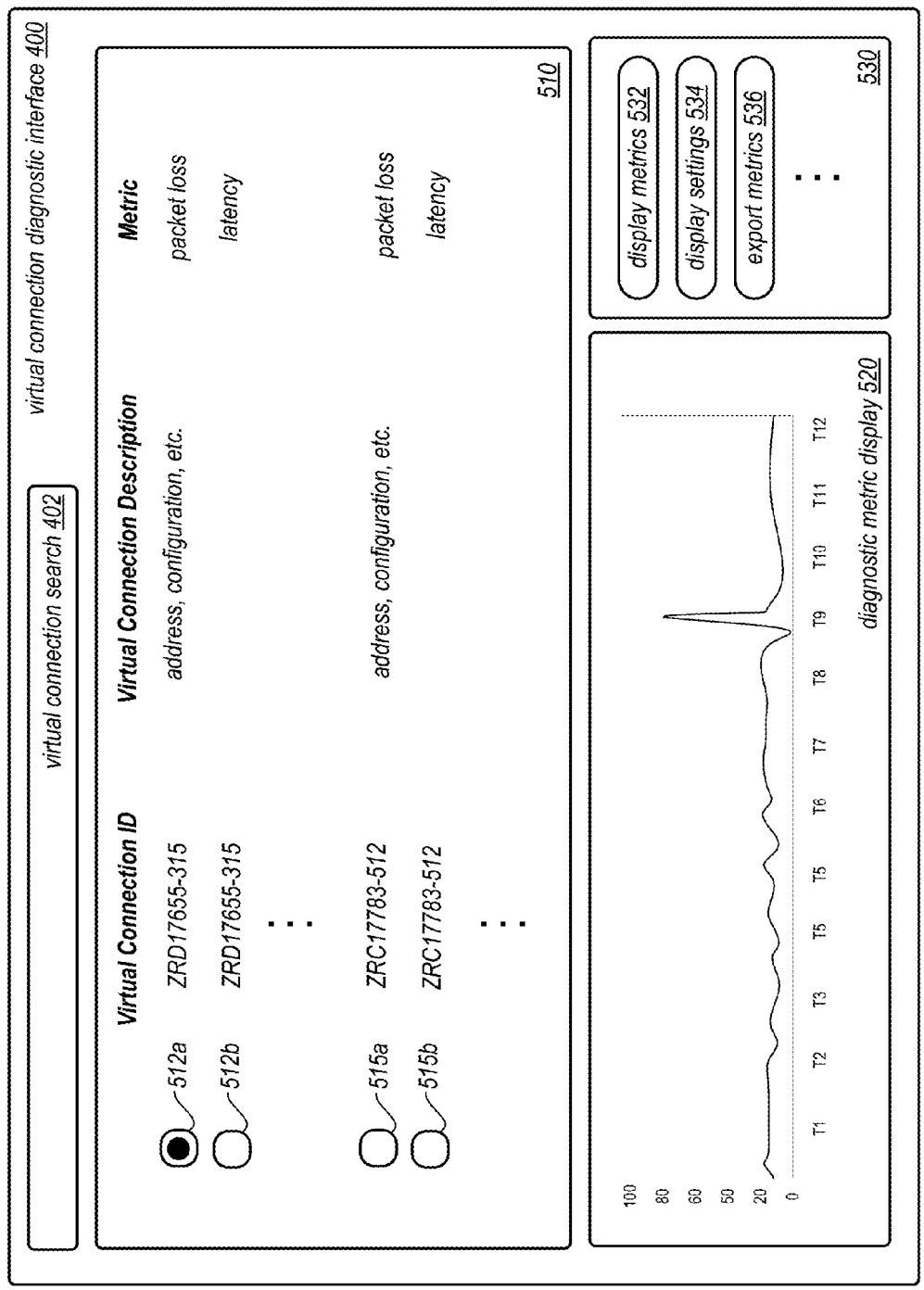
FIG. 5 is a diagram illustrating a graphical user interface for accessing diagnostic metrics for a virtual connection into a provider network, according to various embodiments.

In addition to providing a graphical user interface for enabling/disabling virtual connections, a graphical user interface may be implemented to provide diagnostic metrics for different virtual connections to a provider network. FIG. 5 is a diagram illustrating a graphical user interface for accessing diagnostic metrics for a virtual connection into a provider network, according to various embodiments. Virtual connection diagnostic interface 400 may implement metric selection element 510, which may display various virtual connections associated with a customer account along with particular diagnostic metrics that may be provided. For example, virtual connection ZRD17655-315 is illustrated as providing at least a packet loss metric, and a latency metric for the virtual connection. User interface elements 512a and 512b (e.g., radio or checkbox selection elements) allow a user to select one or more metrics for display. In some embodiments, multiple virtual connections may be selected for diagnostic metrics, such as virtual connection ZRC17783-512, which may have packet loss and/or latency selected in response to user interaction with user interface elements 515a and 515b.

In at least some embodiments, virtual connection diagnostic interface 400 may implement a metric display and configuration menu 530 which may allow a user to display, modify, or otherwise interact with diagnostic metrics provided in diagnostic metric display element 520. Display metrics element 532 may instigate the display of selected metrics (e.g., from 512a, 512b, . . . 515a, 515b). For example, a request may be formatted in response to the selection of element 532 according to a programmatic interface for the provider network, to request the selected diagnostic metrics, which may then be retrieved/generated (according to the various techniques described below with regard to FIG. 8). In at least some embodiments display settings element 534 may be used to adjust or modify the way in which the metrics are displayed in display element 520. For example, the format of display may change from a graph (as illustrated) to a numerical display. In some embodiments, display settings 534 may allow diagnostic metric display 520 to be updated dynamically, providing a real-time view of changes in latency, packet loss, or any other diagnostic metric collected for a virtual connection. In at least some embodiments, a selection of user interface element 536 may trigger a download or other kind of export of the selected diagnostic metrics.

Note, that the example graphical user interfaces illustrated in discussed above with regard to FIGS. 4 and 5 are merely provided as examples of a graphical user interface for diagnostic metric collection and provision, and thus are not intended to be limiting.

Figure 6:
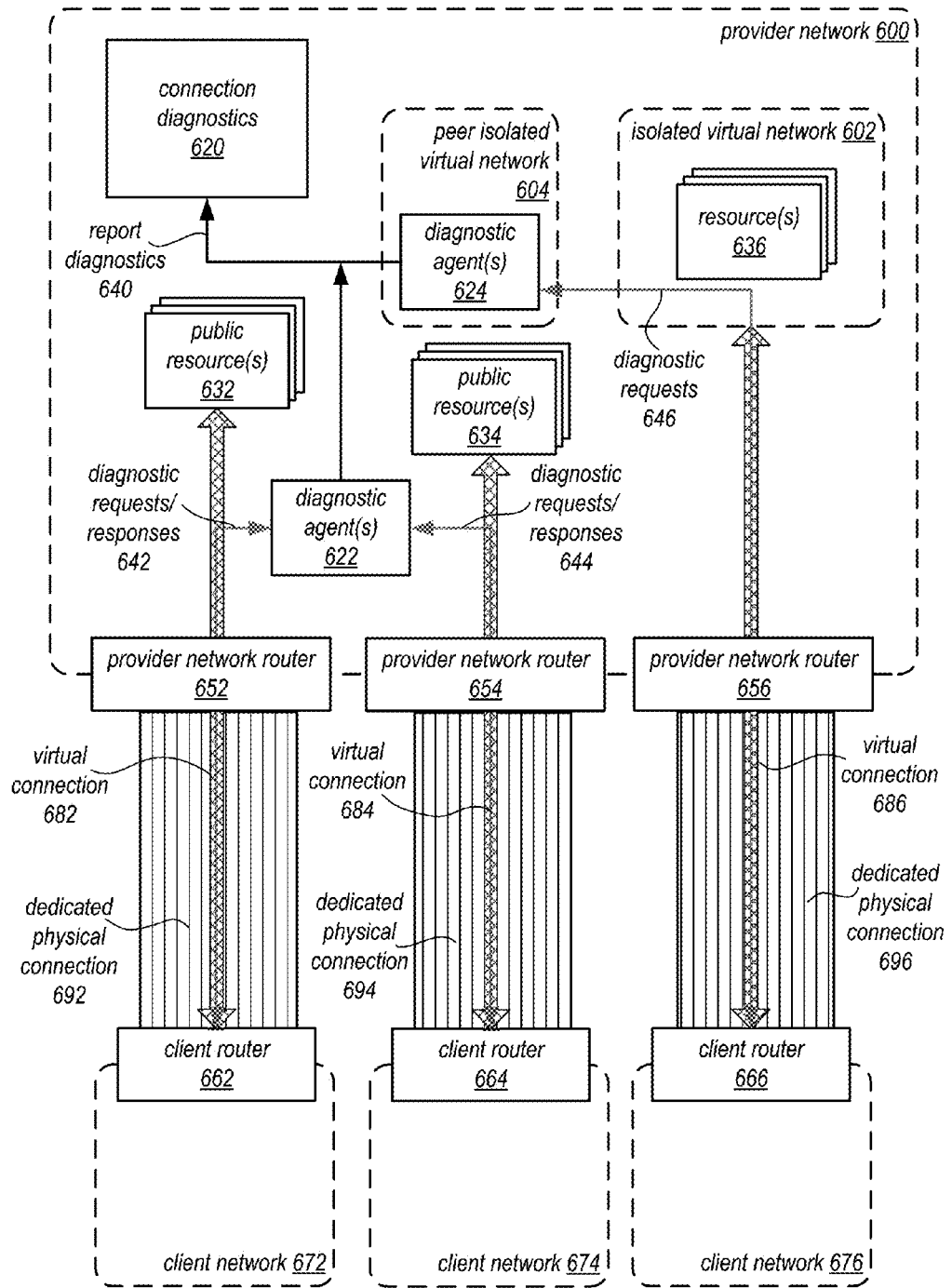
FIG. 6 is a block diagram illustrating various types of resources and configurations of diagnostic agents for virtual connections into a provider network, according to some embodiments.

A provider network may offer various types of resources and/or configurations of those resources. In at least some embodiments, the resources may be broadly categorized as public resources, or isolated resources (which may have limited availability to authorized users). Virtual connections may allow client networks to access both types of resources in a provider network. As some resources are less accessible, the provisioning and enabling of diagnostic metric collection for different virtual connections may be performed differently. FIG. 6 is a block diagram illustrating various types of resources and configurations of diagnostic agents for virtual connections into a provider network, according to some embodiments.

Provider network 600 implements different respective resources for different client networks. For example, public resources 632 and 634 may be respectively accessed by client network 672 and client network 674. These public resources may be portions of larger services or resources that provider network 600 makes available over public connections (as discussed above with regard to public network 260 in FIG. 2). However, dedicated physical connections may allow client networks 672 and 674 to utilize the public resources more efficiently, with higher performance. Thus, client network 672 may install a dedicated physical connection 692 between a client router 662 and a provider network router 652, implementing a virtual connection 682 between client network 672 and public resources 632 over dedicated physical connection 692. Similarly, client network 674 may install a dedicated physical connection 694 between a client router 664 and a provider network router 654, implementing a virtual connection 684 between client network 674 and public resources 634 over dedicated physical connection 694.

To enable diagnostic metric collection for virtual connections 682 and 684, a diagnostic agent 622 may be provisioned within the provider network 600, which may access those publicly available resources, as well as the virtual connections (682 and 684) connected to them. In this way, diagnostic agent(s) 622 may send and receive diagnostic requests/responses 642 and 644 to the client-side endpoints (which may be hosted and client routers 662 and 664 respectively). Diagnostic agents may then report the diagnostics collected 640 to connection diagnostics module 640 (which may provide diagnostic metrics to various clients associated with client network 672 and 674). Please note that in some embodiments, as illustrated in FIG. 6, diagnostic agent(s) 622 may be configured to collect diagnostic metrics for multiple virtual connections at multiple provider network routers and/or client networks.

In some embodiments, a client of a provider network may desire to utilize a set of resources that limit access those resources. For instance, in FIG. 6, resources 636 are maintained in isolated virtual network 602. Client network 676 may implement a dedicated physical connection 696 between client router 666 and provider network router 656 in order to facilitate virtual connection 686. Provider network 600 may support establishment of "isolated virtual networks" (sometimes referred to as IVNs) on behalf of various customers. An isolated virtual network (which may also be referred to in some environments as a virtual private cloud or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the isolated virtual network resources, manage the creation of subnets within the isolated virtual network, and the configuration of route tables, gateways, etc. for the isolated virtual network. For at least some of the devices within an isolated virtual network, in some embodiments, the network addresses may not be visible outside the isolated virtual network, at least by default.

In various embodiments, in order to enable connectivity between an isolated virtual network and the client network (e.g., devices at the client's data center or office premises) via a dedicated physical connection, a virtual connection that is configured for use with private addresses (and is therefore termed a private virtual interface) and a virtual private gateway may be set up. As illustrated in FIG. 6, client network 676 implements virtual connection 686 over dedicated physical connection 696 in order to access resources 636 in isolated virtual network 602. For example, a client-side gateway (e.g., for traffic directed to or from the client network 676 external network) may also have to be set up in some implementations. In some embodiments one or more VPNs (virtual private network) may be configured between the customer's isolated virtual network and external networks (such as the client's office network or the client's data centers). In at least some embodiments, such VPNs may utilize secure networking protocols such as IPSec (Internet Protocol Security), SSL/TLS (Secure Sockets Layer/Transport Layer Security), DTLS (Datagram Transport Layer Security) and the like.

As resources 636 are logically isolated as part of isolated virtual network 602, a diagnostic agent with special permissions or configuration to access isolated virtual network 602 may be provisioned in order to send diagnostic requests to and receive diagnostic responses from a client-side endpoint for the virtual connection to the isolated virtual network 636. In some embodiments, provider network 600 may provision, instantiate, and/or implement a peer isolated virtual network 604, that allows nodes, components, or systems within the peered isolated virtual network to access the isolated virtual network 602 with which it is peered. For example, as illustrated in peer isolated network 604, diagnostic agent(s) 624 may communicate with isolated virtual network 602, and thus may reach the virtual connection 686 in order to communicate with the client-side virtual connection endpoint for virtual connection 686. Diagnostic requests/responses 646 may be sent via virtual connection 686 between the client-side virtual connection endpoint (e.g., which may be implemented at client router 666) and diagnostic agent(s) 624 in peer isolated virtual network 604. As with diagnostic agent(s) 622 discussed earlier, diagnostic agent(s) 624 may report diagnostics collected 640 to connection diagnostics module 620, which may provide diagnostic metrics to clients associated with client network 676. In at least some embodiments, the request to enable diagnostic metrics for a virtual connection to an isolated network may include one or more subsequent actions to allow a peer isolated virtual network, or other technique, access to the isolated virtual network for the diagnostic agents to collect diagnostic information. Please note that although FIG. 6 illustrates a peer isolated virtual network as an example of a configuration for a diagnostic agent to collect diagnostic metrics for a virtual connection to an isolated virtual network, other techniques, such as tunneling, may be implemented to allow diagnostic agents to send/receive diagnostic requests/responses via virtual connection 686 to a client-side virtual connection endpoint (e.g., client router 666), and thus the previous examples are not intended to be limiting.

Figure 7:
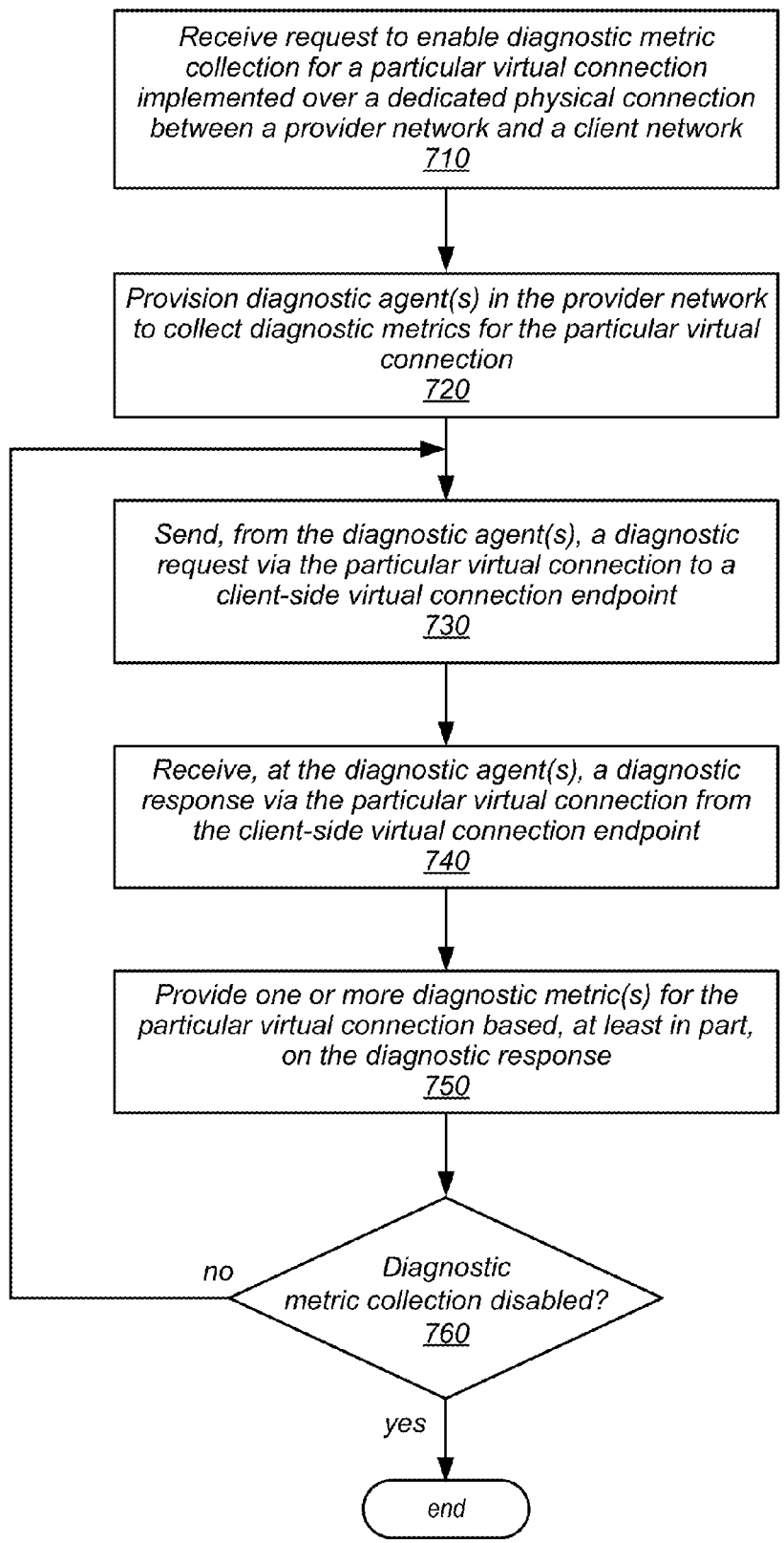
FIG. 7 is a high-level flow chart that illustrates various methods and techniques for providing diagnostic metrics for virtual connections over physical connections into a provider network, according to various embodiments.

The examples of implementing providing diagnostic metrics for virtual connections over a physical connection to a provider network discussed above with regard to FIGS. 2-6 have been given in regard to a particular provider network. Various other types or configurations of a provider network may implement these techniques. The interface, physical dedicated connection, computing services or resources, or any other component of the provider network, or client network, may be differently implemented. FIG. 7 is a high-level flow chart that illustrates various methods and techniques for providing diagnostic metrics for virtual connections over physical connections into a provider network, according to various embodiments. These techniques may be implemented using various components of a provider network as described above with regard to FIGS. 2-6 or other provider network components.

As indicated at 710, a request may be received to enable diagnostic metric collection for a particular virtual connection implemented over a dedicated physical connection between a provider network and a client network, in various embodiments. The request may be received via an interface for the provider network. The provider network interface may be programmatic, such as an API as illustrated in FIG. 3, or be implemented as part of graphical user interface (e.g., which may be implemented as part of a website), as discussed above with regard FIG. 4. The request may include information identifying the particular virtual connection (e.g., a connection identifier), the dedicated physical connection, the amount or type of diagnostic metrics to collect, a client-side virtual connection endpoint, and/or any other information to perform virtual connection diagnostics. However requested, state information or metadata describing the particular virtual connection may be modified to indicate that diagnostic metric collection for the particular virtual connection is enabled. In at least some embodiments, the request may include authorization to charge or deduct a service fee for diagnostic metric collection from a user account of the provider network associated with the particular virtual connection.

In some embodiments, diagnostic agent(s) may be provisioned in the provider network, in response to the request to enable diagnostic metric collection, to collect diagnostic metrics for the particular virtual connection, as indicated at 720. For example, a control plane or other resource manager may activate or instantiate computing nodes (which may be implemented virtually on a virtualization host) or may be provisioned from a dedicated diagnostic agent system or device (e.g., a particular server). Identification information provided in the control may be passed to a diagnostic agent as a target virtual connection and client-side endpoint to which diagnostic requests may be directed. In at least some embodiments, diagnostic agent(s) may collect diagnostic information for multiple different virtual connections, whether connected to the same client network or to a different client network (and thus communicating via different dedicated physical connections).

As discussed above with regard to FIG. 6, in some embodiments, the virtual connection may be connected to public or isolated resources. Diagnostic agents may therefore be provisioned to communicate via the particular virtual connection as in the examples discussed above (such as via a peered isolated network, tunneling, or other access techniques to allow a diagnostic agent to access the private resources and virtual connection). Diagnostic agents may also be collocated with the resources connected to the particular virtual connection. For example, in some embodiments, a provider network may implement multiple fault tolerant zones, which may isolate failures to a particular zone such that a failure in or of one fault tolerant zone may not cause or trigger a failure in another fault tolerant zone (allowing computing resources in the other fault tolerant zone to continue operating in the event of a failure of another fault tolerant zone). Different data centers, isolated power or computing infrastructures, and/or other provider network architectures may be implemented to provide multiple fault tolerant zones (sometimes referred to as availability zones). Diagnostic agents may be provisioned and co-located in the same availability zones as the resources connected to the particular virtual connection. In order to provide greater durability for the collection of diagnostic information for a particular virtual connection multiple diagnostic agents may be provisioned for the same virtual connection (and in some embodiments multiple diagnostic agents may provisioned in each fault tolerant zone).

As indicated at 730, send, from the diagnostic agent(s), one or more diagnostic requests to a client-side virtual connection endpoint for the particular virtual connection via the particular virtual connection, in various embodiments. A diagnostic request may be any form of requests that initiates one or more diagnostic responses traversing the particular virtual connection, in order to describe the particular virtual connection (or the status, health, or result of interacting with the particular virtual connection). For example, in at least some embodiments Internet Control Message Protocol (ICMP) messages may be used to send a ping of multiple data packets to the client-side endpoint. A router or other network traffic controlling device implemented at the client network hosting the client-side virtual connection endpoint may respond to the diagnostic requests (as appropriate to the diagnostic requests). Thus if the diagnostic requests are ICMP messages asking for an echo packet to be sent back to the diagnostic agent via the particular virtual connection. One or more responses may be received at the diagnostic agent(s) via the particular virtual connection from the client-side virtual connection endpoint, as indicated at 740. In this way, the diagnostic requests may travel the same network path along the particular virtual connection as other data transmitted via the particular network connection to the resources in the provider network.

In at least some embodiments, the diagnostic agents may store in local, or network-based storage, the responses (or information extracted or calculated from the responses). For instance, diagnostic agent(s) may log the diagnostic information received, extracted, or determined from the diagnostic responses. Diagnostic agent(s) may also generate or calculate diagnostic metrics (as discussed below with regard to FIG. 8), or may report the diagnostic information/responses to a control plane or other provider network component (e.g., connection diagnostics module 212 in FIG. 2) that manages/provides diagnostic metrics for virtual connections.

One or more diagnostic metrics may be provided for the particular virtual connection based, at least in part on the one or more diagnostic responses, as indicated at 750. For example, the diagnostic responses may include raw information describing the roundtrip time for a particular data packet. This raw information may be provided as diagnostic metrics, in some embodiments. Calculations, modifications, or other analysis of the diagnostic information may be made and provided in some embodiments based on the raw diagnostic information. For example, the round trip time for multiple packets in a particular time period may be averaged, and provided to a client or other requesting system or device (which may be authorized to view the diagnostic metrics).

Figure 8:
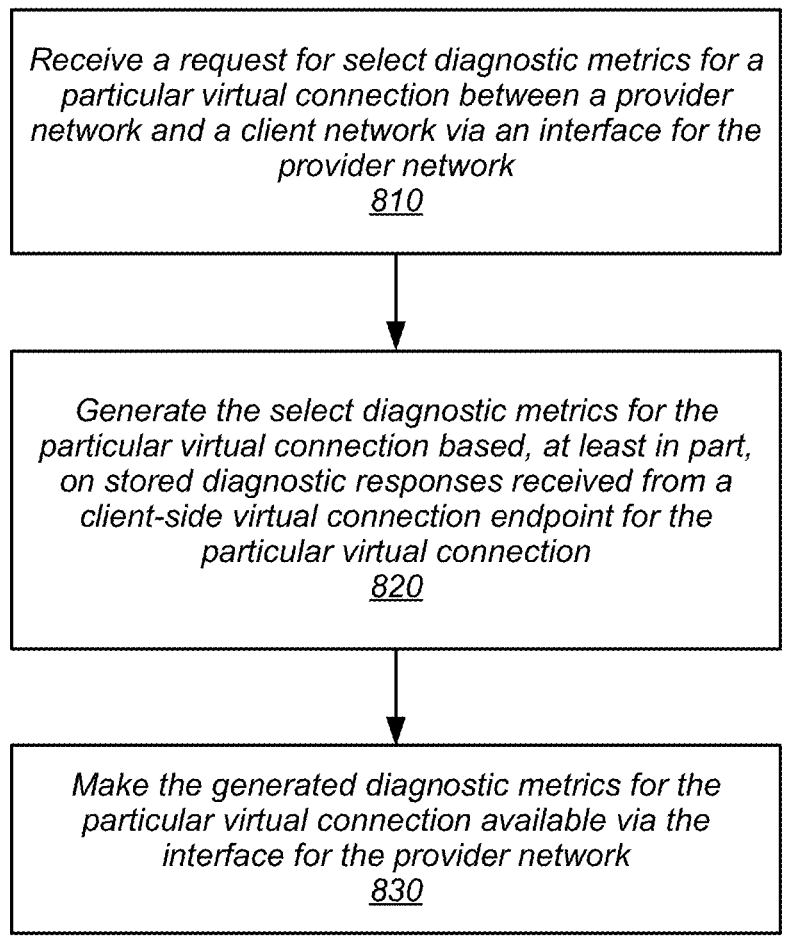
FIG. 8 is a high-level flow chart that illustrates various methods and techniques for generating diagnostic metrics for a virtual connection, according to some embodiments.

In at least some embodiments, a request for diagnostic metrics may be received and diagnostic metrics provided in response, as discussed below with regard to FIG. 8. In some embodiments, multiple diagnostic agents collecting diagnostic information for the same virtual connection may report diagnostic information to a common component, such as connection diagnostics module 212 in FIG. 2, to aggregate diagnostic information from multiple diagnostic agent(s) to provide diagnostic metrics. Diagnostic metrics may be provided via an interface for the provider network, such as a programmatic interface like an API and/or a graphical user interface. In some embodiments, the diagnostic metric may be published, sent, downloaded, stored, or transferred to a different location (e.g., to a client device external to a provider network) for subsequent analysis.

Enabling diagnostic metric collection may repeatedly perform the steps of sending (730) and receiving (740) diagnostic requests and responses. In some embodiments, diagnostic metrics may be provided on demand, in response to a request for instance, or may be automatically made available, streamed, or otherwise provided in real-time or near real-time. Thus, if diagnostic metric collection is still enabled, as indicated by the negative exit from 760, the diagnostic agent(s) may continue to send diagnostic requests to and receive diagnostic responses from the client-side virtual connection endpoint. However, diagnostic metric collection may be disabled for the particular virtual connection. For example, an API call or request message may be sent to a provider network interface. In response to receiving the request to disable diagnostic metric collection, the state information or metadata describing the particular virtual connection may be modified to indicate that diagnostic metric collection for the particular virtual connection is disabled. In various embodiments, the sending and receiving of subsequent diagnostic requests and responses may be halted, in various embodiments. The diagnostic metrics already collected may be persistently stored or, in some embodiments may be deleted or reclaimed.

The techniques described above may be applied to multiple virtual connections individually, even virtual connections implemented on a same dedicated physical connection to the provider network from the client network. For instance, some virtual connections may be used to test or develop certain applications or utilizations of resources in the provider network and thus diagnostic metrics for the virtual connection may not be as useful for those virtual connections as for other virtual connections which may be used for systems or services "in production."

In some embodiments, diagnostic metrics may be evaluated and trigger alarms or other events after exceeding, falling below, or otherwise satisfying some event criteria. Notifications, for instance, may be sent to clients whose virtual connections fall below some kind of performance/health threshold. In at least some embodiments, alarms or events may be configured by a client associated with a provider network based on the diagnostic metrics collected.

Diagnostic metrics may be created, generated, presented, and/or otherwise provided in various ways, as noted above. The amount of diagnostic information collected as result of the diagnostic requests and responses may quickly grow into a large set of data (depending on the rate or granularity at which diagnostic information is collected). In at least some embodiments, a provider network may implement an interface, whether programmatic, such as an API, and/or a graphical user interface such as discussed above with regard to FIG. 5, that allows for select portions of the diagnostic information to be used in generating the diagnostic metrics provided. Moreover, as different types of diagnostic metrics may be provided, selections may be made as to particular types of diagnostic metrics. FIG. 8 is a high-level flow chart that illustrates various methods and techniques for generating diagnostic metrics for a virtual connection, according to some embodiments.

As indicated at 810, a request for select diagnostic metrics may be received for a particular virtual connection between a provider network and a client network, in some embodiments. The request may be received via a provider network interface, such as a particular API command/message/request sent to the provider network, or through interaction with various user interface elements, such as illustrated in FIG. 5. The interface may be network-based, accepting, for example, requests and providing responses according to various network-based protocols and techniques (e.g., REST, SOAP, etc.). The request may specify the type of diagnostic metric, latency for packets traversing the particular virtual connection, packet loss over the virtual connection, or other connection health or performance metric. The request may specify a time frame, range, or other indicator that identifies a subset of the diagnostic information collected—though the request may alternatively specify that all of the collected diagnostic information for the type of diagnostic metric be provided. A request may either specify rolling average latency over the last 6 hour period, for instance, or over the lifetime that the particular virtual connection is enabled (and which metric collection is also enabled). The request may specify presentation of the select diagnostic metrics (e.g., graph, raw data, or current value). The request may also specify delivery of the diagnostic metrics (e.g., a file, data stream, or communication technique) for receiving the data.

In various embodiments, the select diagnostic metrics for the particular virtual connection may be generated based, at least in part, on stored diagnostic responses received from a client-side virtual connection endpoint for the particular virtual connection, as indicated at 820. The various selections or specifications discussed above may be used to identify diagnostic information in the diagnostic responses to use to generate the diagnostic metrics. Consider the example noted above of rolling latency for the virtual connection for a period of time. The diagnostic information in the responses may be searched (e.g., a database or other structured format maintaining the diagnostic information may be scanned) to collect latency information for the virtual connection within the period of time. In some embodiments, if more than one diagnostic agent has collected latency information, the latency may be averaged together. Various information calculations, combinations or manipulations may be performed to generate the diagnostic metric, and thus the previous example is not intended to be limiting.

As indicated at 830, the generated diagnostic metrics for the particular virtual connection may be made available via the interface for the provider network, in some embodiments. The presentation or delivery of the generated diagnostic metrics may be performed according to the request for diagnostics, as previously noted. For instance, the diagnostic metrics may be packaged together into a file that is accessible that is then downloaded to a requesting client. In another example, as discussed above with regard to FIG. 5, the diagnostic metrics may be displayed at a graphical user interface. In some embodiments, the presentation of the generated diagnostic metrics may be interactive and/or updated in real time as new diagnostic information is collected for the particular virtual connection.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the router data service described herein). The various methods as illustrated in the figures and described herein represent example embodiments of methods. The order of any method may be changed, and various elements may be added, reordered, combined, omitted, modified, etc.

Figure 9:
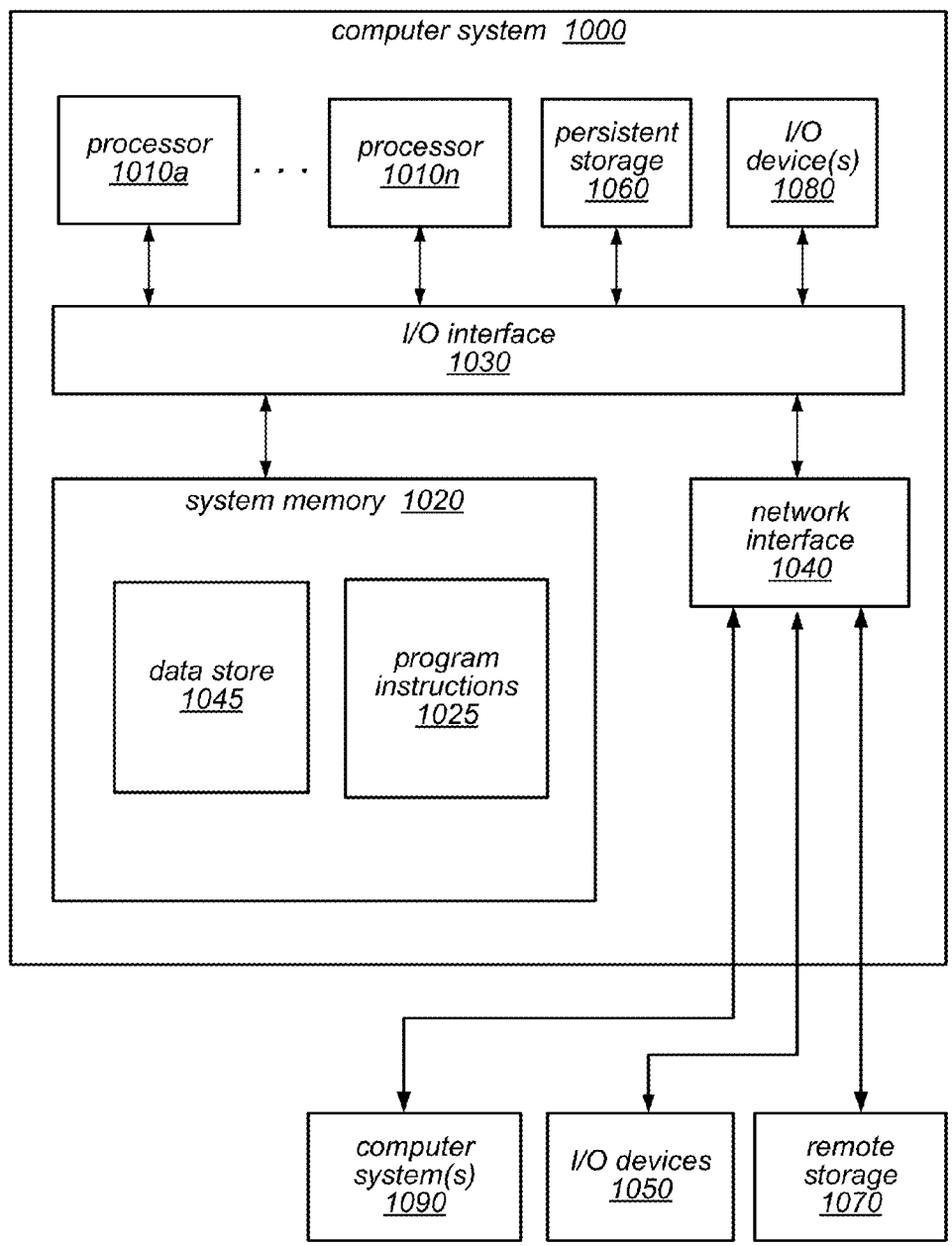
FIG. 9 is a block diagram illustrating an example computing system, according to some embodiments.

Embodiments of providing diagnostic metrics for virtual connections over a physical connection into a provider network as described herein may be executed on one or more computer systems, which may interact with various other devices. FIG. 9 is a block diagram illustrating an example computer system, according to various embodiments. For example, computer system 1000 may be configured to implement nodes of a provider network, such as may implement various resources, a control plane, or diagnostic agents, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more nodes, endpoints, systems, or services internal to or external to a provider network, and/or clients of the provider network described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a plurality of compute nodes that together implement a provider network that provides one or more computing resources for a client;
 an edge router for the provider network that implements a dedicated physical connection to connect a client network for the client to the provider network, wherein the edge router supports one or more virtual connections between the client network and the one or more computing resources implemented over the dedicated physical connection;
 a provider network interface;
 one or more of the plurality of compute nodes of the provider network that implement at least one diagnostic agent, configured to:
  in response to receipt of a request to enable diagnostic metric collection for one or more diagnostic metrics for a particular virtual connection of the one or more virtual connections via the provider network interface:
   send via the particular virtual connection, one or more diagnostic requests to a client-side connection endpoint for the particular virtual connection;

receive, via the particular virtual connection, one or more diagnostic responses to the one or more diagnostic requests; and the provider network interface, configured to:

provide one or more diagnostic metrics for the particular virtual connection that are based, at least in part, on the one or more diagnostic responses received at the at least one diagnostic agent.

2. The system of claim 1, wherein the at least one diagnostic agent is further configured to store the one or more diagnostic responses;

wherein to provide the one or more diagnostic metrics for the particular virtual connection, the provider network interface is configured to:

receive a request for the one or more diagnostic metrics for the particular virtual connection; and generate the one or more diagnostic metrics for the particular virtual connection from the stored one or more diagnostic responses.

3. The system of claim 1, wherein the at least one diagnostic agent is further configured to:

in response to receipt of a request to disable diagnostic metric collection via the provider network interface, halt subsequent diagnostic requests to the client-side connection endpoint for the particular virtual connection.

4. The system of claim 1, wherein the provider network is a network-based service platform, wherein the one or more resources are some of a plurality of network-based computing services implemented as part of the network-based services platform, wherein the dedicated physical connection provides a private network connection that is separate from one or more public network connections to the provider network, and wherein the provider network interface is a network-based interface configured to receive requests via the dedicated physical connection and the one or more public network connections.

5. A method, comprising:

performing, by one or more computing devices:

receiving a request to enable diagnostic metric collection for one or more diagnostic metrics for a particular virtual connection implemented over a dedicated physical connection between a client network and one or more resources implemented as part of the provider network;

in response to receiving the request to enable diagnostic metric collection:

sending, from at least one diagnostic agent located in the provider network, one or more diagnostic requests via the particular virtual connection to a client-side connection endpoint for the particular virtual connection;

receiving, at the at least one diagnostic agent, one or more diagnostic responses to the one or more diagnostic requests via the particular virtual connection; and providing one or more diagnostic metrics for the particular virtual connection that are based, at least in part, on the one or more diagnostic responses.

6. The method of claim 5, wherein the request to enable diagnostic metric collection is received via a programmatic interface for the provider network.

7. The method of claim 5, wherein the method further comprises storing the one or more diagnostic responses to the one or more diagnostic requests;

wherein providing the one or more diagnostic metrics for the particular virtual connection comprises:

receiving a request for the one or more diagnostic metrics for the particular virtual connection via a network-based interface for the provider network;

generating the one or more diagnostic metrics for the particular virtual connection from the stored one or more diagnostic responses; and wherein the one or more diagnostic metrics are provided via the network-based interface for the provider network.

8. The method of claim 7, wherein the network-based interface is a graphical user interface for the provider network.

9. The method of claim 5, further comprising provisioning the at least one diagnostic agent in response to receiving the request to enable diagnostic metric collection.

10. The method of claim 9, wherein the one or more resources are implemented as part of an isolated virtual network within the provider network, wherein visibility of the client-side connection endpoint is restricted to the isolated virtual network, and wherein provisioning the at least one diagnostic agent comprises configuring the at least one diagnostic agent to access the isolated virtual network in order to send diagnostic requests via the virtual connection endpoint.

11. The method of claim 9, wherein the one or more resources are located within a respective one of a plurality of fault tolerant zones, and wherein provisioning the at least one diagnostic agent comprises provisioning one or more respective diagnostic agents in respective ones of the plurality of fault tolerant zones.

12. The method of claim 5, further comprising:

receiving a request to disable diagnostic metric collection for the particular virtual connection; and in response to receiving the request to disable diagnostic metric collection, halting subsequent diagnostic requests to the client-side connection endpoint for the particular virtual connection from the diagnostic agent.

13. The method of claim 5, wherein the one or more resources are implemented as part of one or more network-based computing services offered as part of the provider network and wherein the dedicated physical connection provides a private network connection that is separate from one or more public network connections to the provider network.

14. A non-transitory, computer-readable storage medium, storing program instructions that when executed by one or more computing devices cause the one or more computing devices to implement:

receiving a request to enable diagnostic metric collection for one or more diagnostic metrics for a particular virtual connection implemented over a dedicated physical connection between a client network and one or more resources implemented as part of the provider network;

in response to receiving the request to enable diagnostic metric collection:

sending, from at least one diagnostic agent located in the provider network, one or more diagnostic requests via the particular virtual connection to a client-side connection endpoint for the particular virtual connection;

receiving, at the at least one diagnostic agent, one or more diagnostic responses to the one or more diagnostic requests via the particular virtual connection; and providing one or more diagnostic metrics for the particular virtual connection that are based, at least in part, on the one or more diagnostic responses.

15. The non-transitory, computer-readable storage medium of claim 14, wherein the program instructions cause the one or more computing devices to further implement storing the one or more diagnostic responses to the one or more diagnostic requests;

wherein, in providing the one or more diagnostic metrics for the particular virtual connection, the one or more program instructions cause the one or more computing devices to implement:

receiving a request for the one or more diagnostic metrics for the particular virtual connection via a graphical user interface for the provider network;

generating the one or more diagnostic metrics for the particular virtual connection from the stored one or more diagnostic responses; and wherein the one or more diagnostic metrics are provided via the graphical user interface for the provider network.

16. The non-transitory, computer-readable storage medium of claim 14, wherein the request to enable diagnostic metric collection is received via a graphical user interface for the provider network.

17. The non-transitory, computer-readable storage medium of claim 14, wherein the one or more resources are accessible via one or more public network connections that are separate from the dedicated physical connection.

18. The non-transitory, computer-readable storage medium of claim 14, wherein the program instructions cause the one or more computing devices to further implement:

receiving a request to disable diagnostic metric collection for the particular virtual connection; and in response to receiving the request to disable diagnostic metric collection, halting subsequent diagnostic requests to the client-side connection endpoint for the particular virtual connection from the diagnostic agent.

19. The non-transitory, computer-readable storage medium of claim 14, wherein another one or more virtual connections are implemented over the dedicated physical connection between the client network and the provider network, and wherein diagnostic metric collection for at least one of the other one or more virtual connections is not enabled.

20. The non-transitory, computer-readable storage medium of claim 14, wherein the one or more resources are implemented as part of one or more network-based computing services offered as part of the provider network and wherein the dedicated physical connection provides a private network connection that is separate from one or more public network connections to the provider network.

\* \* \* \* \*